United States Patent
Ziliak

(10) Patent No.: US 9,469,374 B2
(45) Date of Patent: Oct. 18, 2016

(54) SPROCKET FLANGE

(71) Applicant: Polaris Industries Inc., Medina, MN (US)

(72) Inventor: Mark Alan Ziliak, Lindstrom, MN (US)

(73) Assignee: Polaris Industries Inc., Medina, MN (US)

( * ) Notice: Subject to any disclaimer, the term of this patent is extended or adjusted under 35 U.S.C. 154(b) by 72 days.

(21) Appl. No.: 14/330,841

(22) Filed: Jul. 14, 2014

(65) Prior Publication Data

US 2016/0010730 A1    Jan. 14, 2016

(51) Int. Cl.
| | |
|---|---|
| F16H 55/30 | (2006.01) |
| F16H 7/00 | (2006.01) |
| B62M 9/02 | (2006.01) |
| F16G 1/08 | (2006.01) |
| F16G 1/28 | (2006.01) |
| F16H 55/36 | (2006.01) |
| F16H 55/48 | (2006.01) |
| B62M 9/00 | (2006.01) |

(52) U.S. Cl.
CPC .............. *B62M 9/02* (2013.01); *F16G 1/08* (2013.01); *F16G 1/28* (2013.01); *F16H 55/36* (2013.01); *F16H 55/48* (2013.01); *B62M 2009/007* (2013.01)

(58) Field of Classification Search
CPC ............. F16H 55/171; F16H 55/30; F16H 2055/306; F16H 55/44; F16H 7/06
USPC ................................. 474/152, 153
See application file for complete search history.

(56) References Cited

U.S. PATENT DOCUMENTS

| | | | | |
|---|---|---|---|---|
| 2,724,975 A | * | 11/1955 | Drummond | F16D 1/087 403/247 |
| 2,923,166 A | * | 2/1960 | Brindley | F16H 55/171 29/892.11 |
| 3,650,158 A | * | 3/1972 | Van Huis | A01K 39/01 366/342 |
| 4,328,879 A | * | 5/1982 | Tone | B62M 9/00 180/219 |

(Continued)

FOREIGN PATENT DOCUMENTS

| | | |
|---|---|---|
| DE | 102008032025 A1 | 1/2010 |
| EP | 0 533 505 A1 | 3/1993 |

(Continued)

OTHER PUBLICATIONS

International Search Report and Written Opinion for PCT/US2014/066368, issued by the European Patent Office, dated Mar. 3, 2015; 12 pages.

(Continued)

*Primary Examiner* — Henry Liu
(74) *Attorney, Agent, or Firm* — Faegre Baker Daniels LLP

(57) ABSTRACT

A synchronous belt sprocket includes a generally circular body including a circumferential belt engagement surface, a plurality of teeth extending radially outwardly from the circumferential belt engagement surface, and at least one flange coupled to the body. The at least one flange has a first end adjacent the body, a second end generally opposite the first end and radially outward from the first end, a surface extending between the first and second ends and facing the circumferential belt engagement surface, and a length defined between the first and second ends. At least half the length of the surface of at least one flange facing the circumferential belt engagement surface is obtusely angled relative to the circumferential belt engagement surface.

17 Claims, 14 Drawing Sheets

(56) References Cited

U.S. PATENT DOCUMENTS

| | | | | |
|---|---|---|---|---|
| 4,464,949 | A * | 8/1984 | Concina | F16H 55/06 474/152 |
| 5,417,617 | A * | 5/1995 | Milton | F16H 55/171 474/205 |
| 6,575,862 | B2 * | 6/2003 | Miyaji | F16H 7/023 474/153 |
| 7,862,460 | B2 * | 1/2011 | Chekansky | F16H 55/30 474/152 |
| 7,914,408 | B2 * | 3/2011 | Young | F16H 7/06 474/152 |
| 8,562,468 | B2 * | 10/2013 | Tomobuchi | F16H 55/171 474/153 |
| 8,979,689 | B2 * | 3/2015 | Dierl | F16H 7/023 474/153 |
| 2003/0199351 | A1 * | 10/2003 | Nichols | B62M 9/10 474/160 |
| 2004/0204274 | A1 * | 10/2004 | Young | F16H 7/06 474/156 |
| 2005/0064972 | A1 * | 3/2005 | Rusheidat | F16H 55/171 474/168 |
| 2005/0170925 | A1 * | 8/2005 | Hamilton | F16H 55/06 474/161 |
| 2007/0105675 | A1 * | 5/2007 | Clarke | A22C 21/02 474/153 |
| 2007/0293361 | A1 * | 12/2007 | Young | F16H 7/06 474/152 |
| 2009/0093328 | A1 * | 4/2009 | Dickinger | F16H 55/171 474/152 |
| 2010/0230192 | A1 | 9/2010 | Riley | |
| 2011/0092326 | A1 * | 4/2011 | Kanamori | F16H 55/171 474/152 |

FOREIGN PATENT DOCUMENTS

| | | |
|---|---|---|
| EP | 1 403 552 A2 | 3/2004 |
| WO | WO 2007/121582 A1 | 11/2007 |

OTHER PUBLICATIONS

Webpage depicting Harley Davidson motorcycles, available at http://www.harley-davidson.com/content/h-d/en_US/home/museum/explore/hd-history/1980.html, copyright 2014, accessed on Jul. 14, 2014, 6 pages.

* cited by examiner

US 9,469,374 B2

SPROCKET FLANGE

BACKGROUND OF THE DISCLOSURE

The present disclosure relates to a powertrain assembly, and more particularly to a belt drive assembly of the powertrain assembly.

Powertrain assemblies of certain on-road vehicles (e.g., motorcycles), off-road vehicles (e.g., snowmobiles), and industrial machines or vehicles (e.g., airport baggage transporters) may include a belt drive assembly. Belt drive assemblies include a belt and at least one sprocket. During operation of the belt drive assembly, the belt may track to one side of the sprocket in response to certain loads on the powertrain assembly. For example, during a torque reversal, the belt may move or track toward one side of the sprocket.

Additionally, during operation of the belt drive assembly, portions of the belt are in contact with the sprocket and a noise may be produced as those portions of the belt rotate off of, or away from, the sprocket.

SUMMARY OF THE DISCLOSURE

In one embodiment of the present disclosure, a synchronous belt sprocket comprises a generally circular body which includes a circumferential belt engagement surface, a plurality of teeth which extend radially outwardly from the circumferential belt engagement surface, and at least one flange coupled to the body. The at least one flange has a first end adjacent the body, a second end generally opposite the first end and radially outward from the first end, a surface extending between the first and second ends and facing the circumferential belt engagement surface, and a length defined between the first and second ends. At least half the length of the surface of at least one flange facing the circumferential belt engagement surface is obtusely angled relative to the circumferential belt engagement surface.

In another embodiment of the present disclosure, a belt drive assembly comprises a synchronous belt having an outer surface, a cord positioned inwardly of the outer surface, and a plurality of belt teeth positioned inwardly of the cord. The plurality of belt teeth have an inner end spaced apart from the cord which define an inner surface of the belt. Additionally, the plurality of belt teeth have an outer end positioned adjacent the cord. The belt drive assembly further comprises at least one sprocket with a body configured to rotate about an axis of rotation, a plurality of sprocket teeth extending radially outwardly from the body and configured to mesh with the plurality of belt teeth, and at least one flange coupled to the body. The at least one flange includes a portion extending radially outward from the body which has a surface exposed to the synchronous belt. The surface exposed to the synchronous belt extends at an obtuse angle relative to the axis of rotation of the body. Additionally, the at least one flange contacts the inner end of the plurality of belt teeth and is spaced apart from the outer end of the plurality of belt teeth.

In a further embodiment of the present disclosure, a powertrain assembly comprises an engine, a transmission operably coupled to the engine, and a belt drive assembly operably coupled to the transmission. The belt drive assembly includes a synchronous belt with a plurality of belt teeth and a cord positioned outwardly from the plurality of belt teeth. The belt drive also includes a sprocket operably coupled to the synchronous belt. The sprocket includes a body configured to rotate about an axis of rotation, a plurality of sprocket teeth extending radially outwardly from the body, and at least one flange coupled to the body. The body has a radially outer surface configured to receive the synchronous belt and the at least one flange has a surface exposed to the synchronous belt. The surface of the at least one flange which is exposed to the synchronous belt extends at an obtuse angle relative to the radially outer surface of the body. Additionally, a distance between the at least one flange and the cord is greater than a distance between the at least one flange and the plurality of belt teeth in a direction parallel to radially outer surface of the body.

DETAILED DESCRIPTION OF THE DRAWINGS

Figure 1:
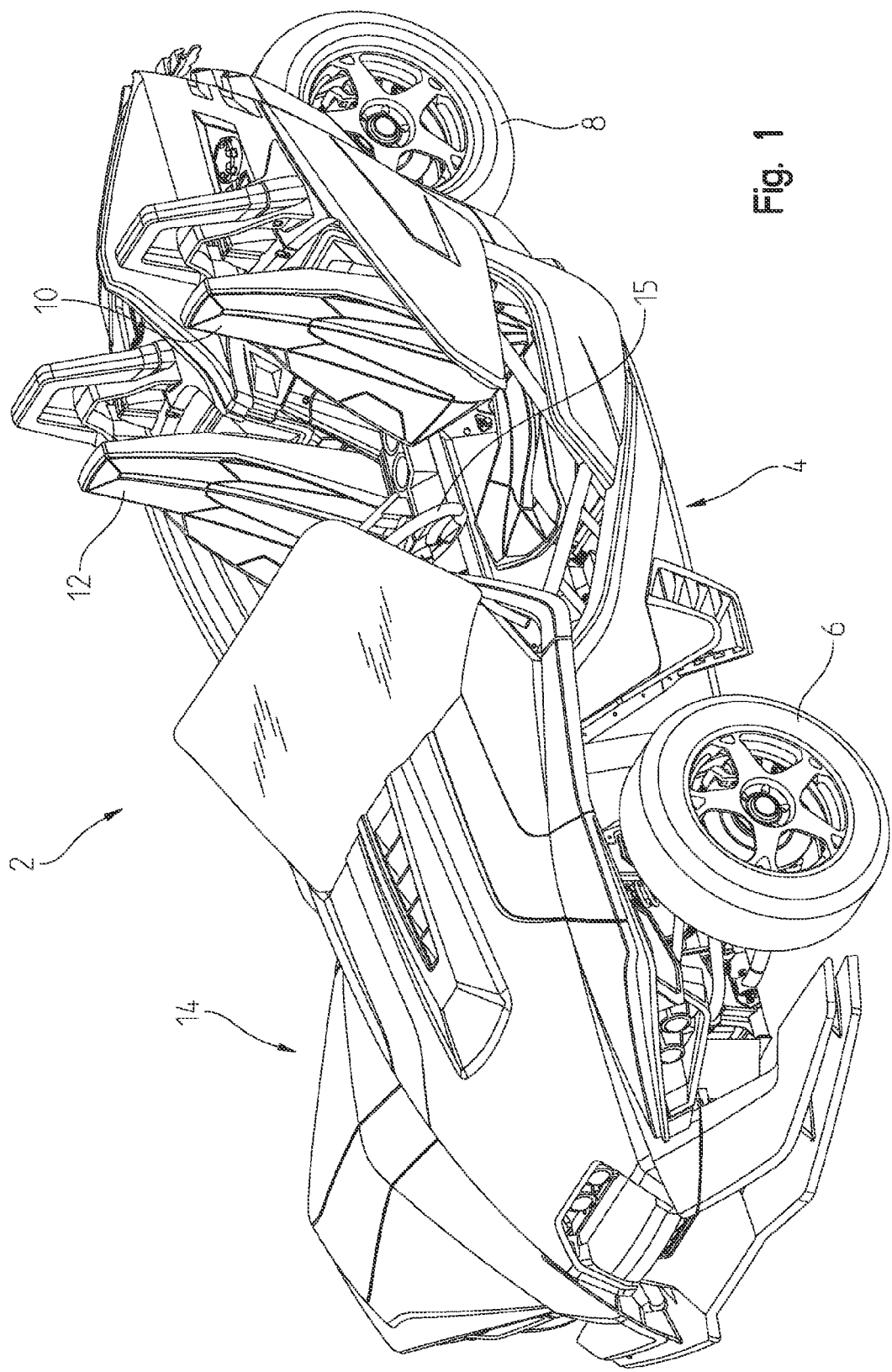
FIG. 1 is a front left perspective view of an exemplary vehicle of the present disclosure.

With reference to FIG. 1, an exemplary vehicle 2 of the present disclosure is a three-wheeled vehicle. Alternatively, vehicle 2 may be an off-road vehicle (e.g., a snowmobile, an all-terrain vehicle, or a utility vehicle), industrial or agricultural equipment or machinery (e.g., a rock crusher), or another embodiment of an on-road vehicle (e.g., a two- or four-wheeled vehicle). The exemplary embodiment of vehicle 2 includes a frame 4 supported by two front wheels 6 and a single rear-wheel 8. Vehicle 2 also includes side-by-side seating, with a driver's seat 10 and a passenger's seat 12. A body assembly 14 generally defines the exterior of vehicle 2 and is supported on frame 4.

Figure 2:
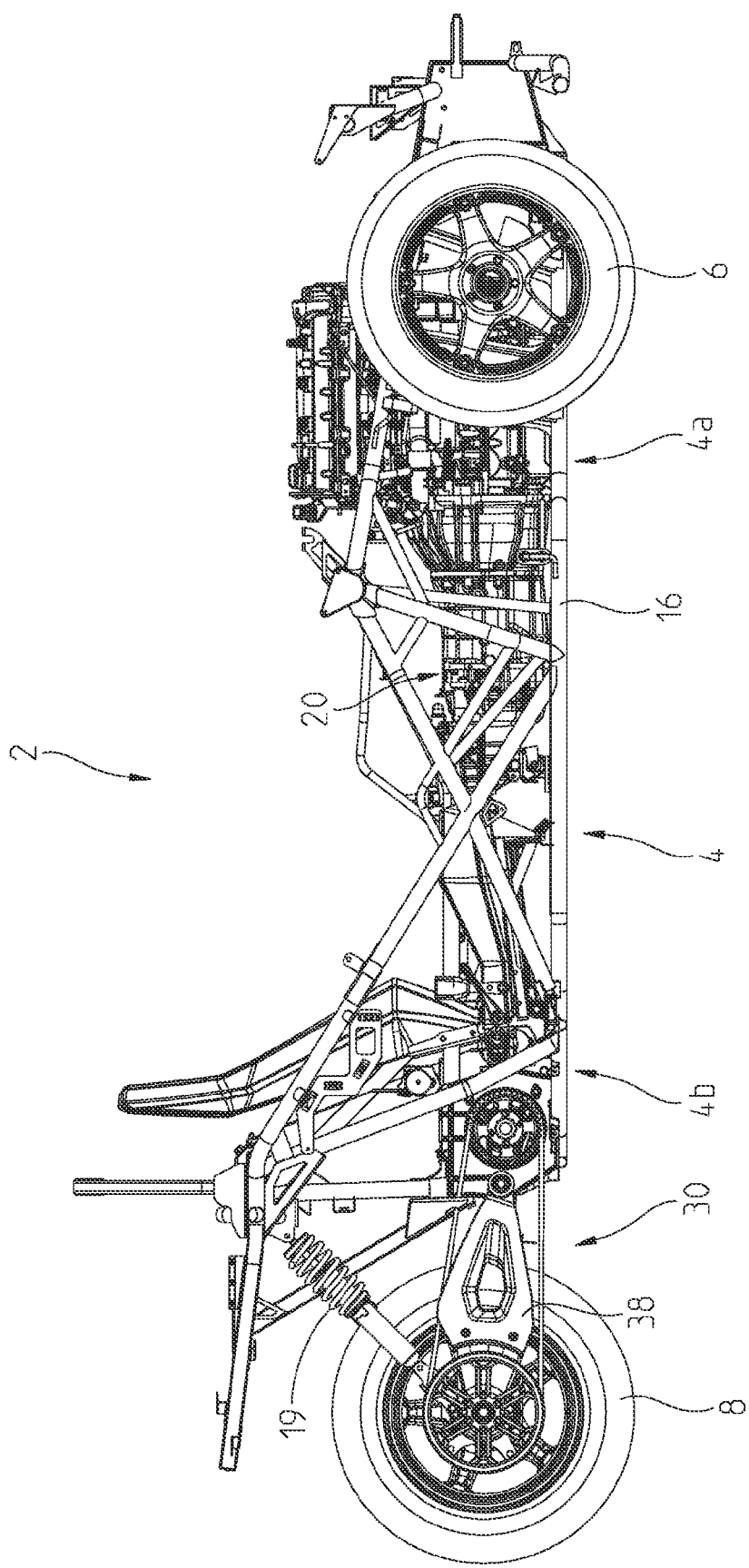
FIG. 2 is a side view of a frame assembly and a powertrain assembly of the vehicle of FIG. 1.
Figure 3:
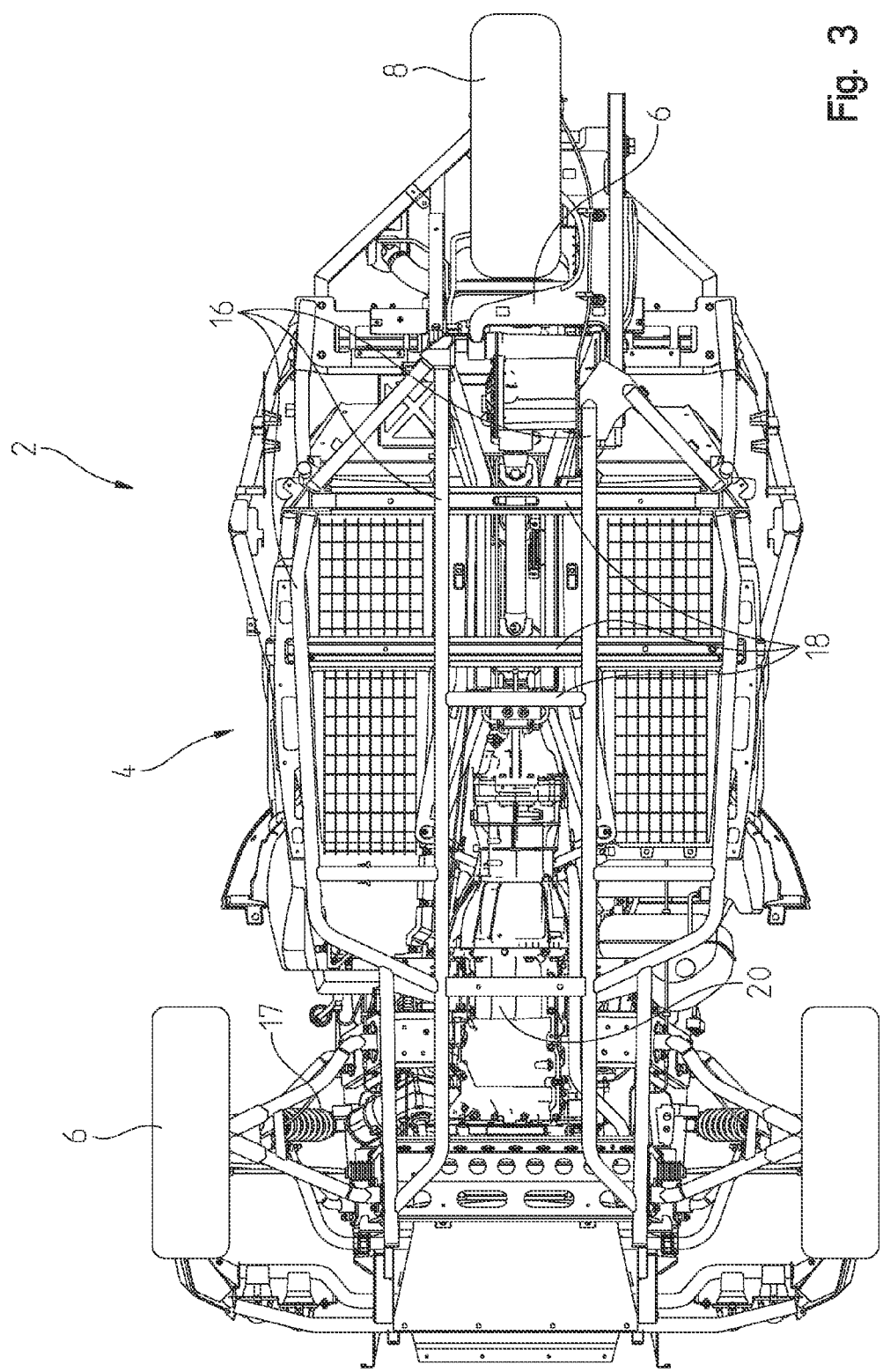
FIG. 3 is a bottom view of the frame assembly and powertrain assembly of the vehicle of FIG. 2.

As shown in FIGS. 2 and 3, frame 4 of vehicle 2 includes a front frame portion 4a and a rear frame portion 4b. Front and rear frame portions 4a, 4b include a plurality of longitudinal frame members 16 and a plurality of cross-braces 18. Longitudinal frame members 16 and cross-braces 18 support various components of vehicle 2, including a steering assembly 15 (FIG. 1), a front suspension assembly 17, a rear suspension assembly 19, a powertrain assembly 20, and seats 10, 12. Additionally, a rear swingarm 38 is coupled to rear frame portion 4b and is operably coupled to rear wheel 8. Rear swingarm 38 is configured to support rear wheel 8 and components of rear suspension assembly 19.

Figure 4:
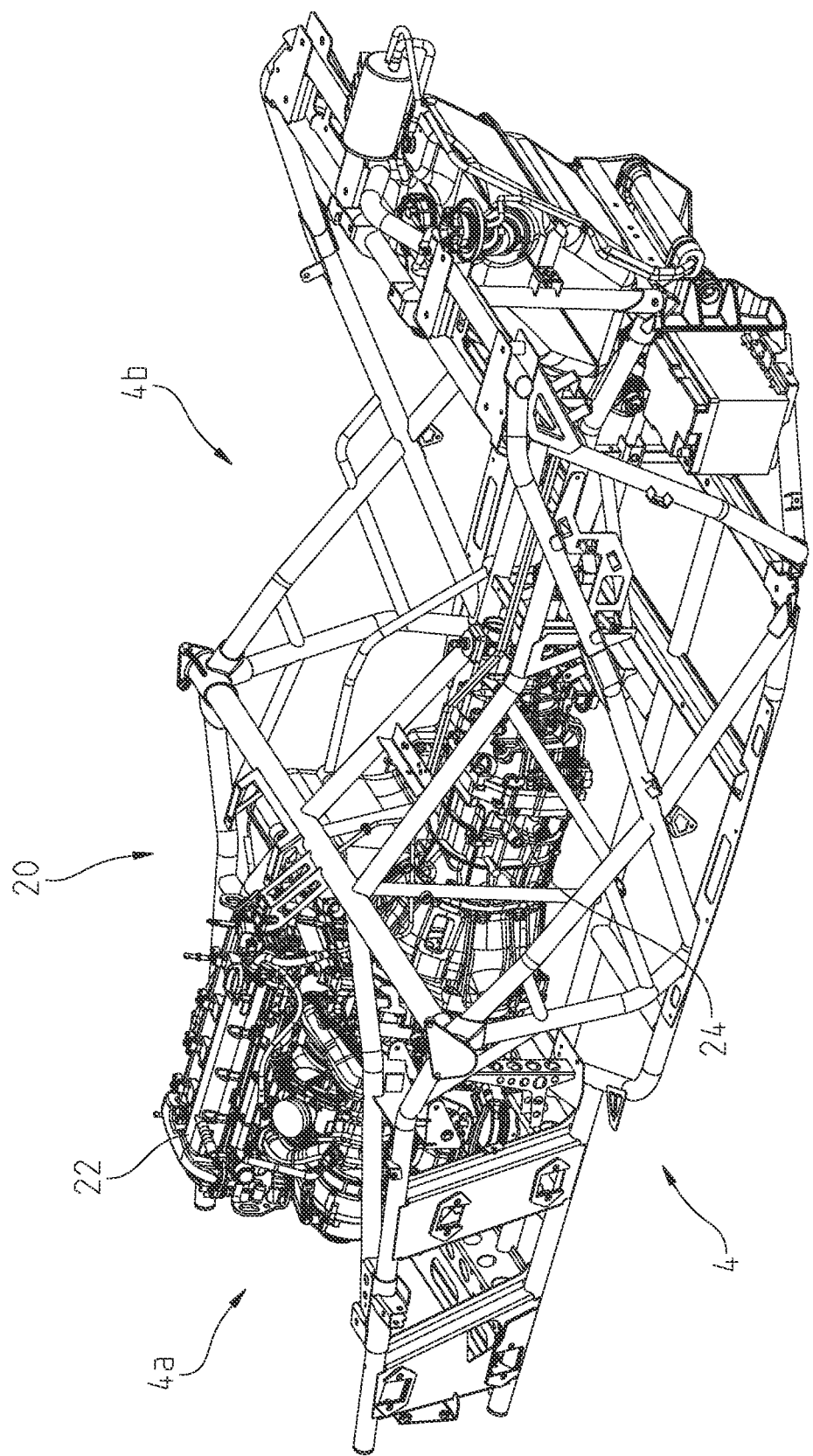
FIG. 4 is a rear left perspective view of a rear portion of the frame assembly and the powertrain assembly of FIG. 2.
Figure 5:
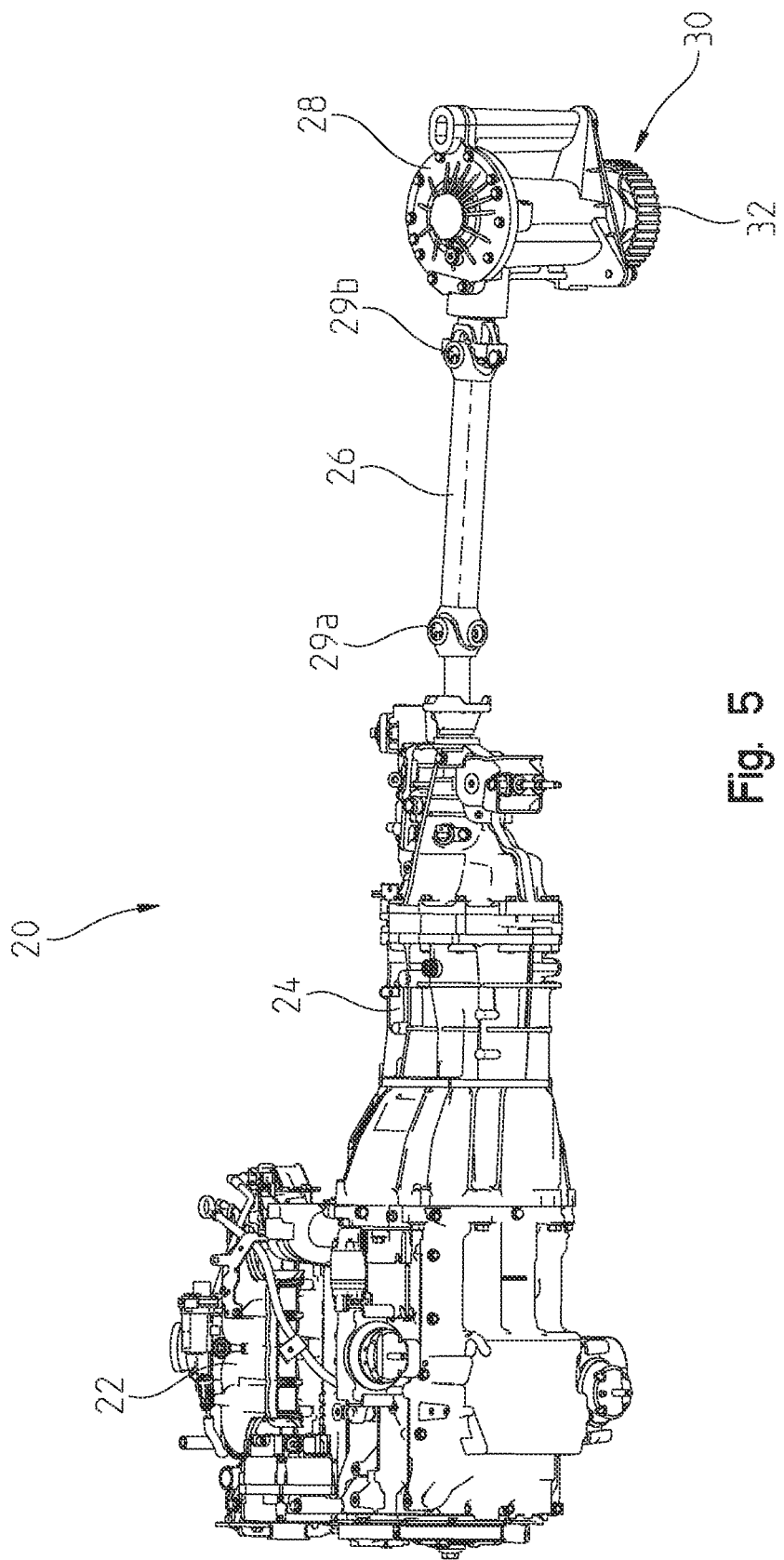
FIG. 5 is a bottom perspective view of the powertrain assembly of FIG. 2.
Figure 6:
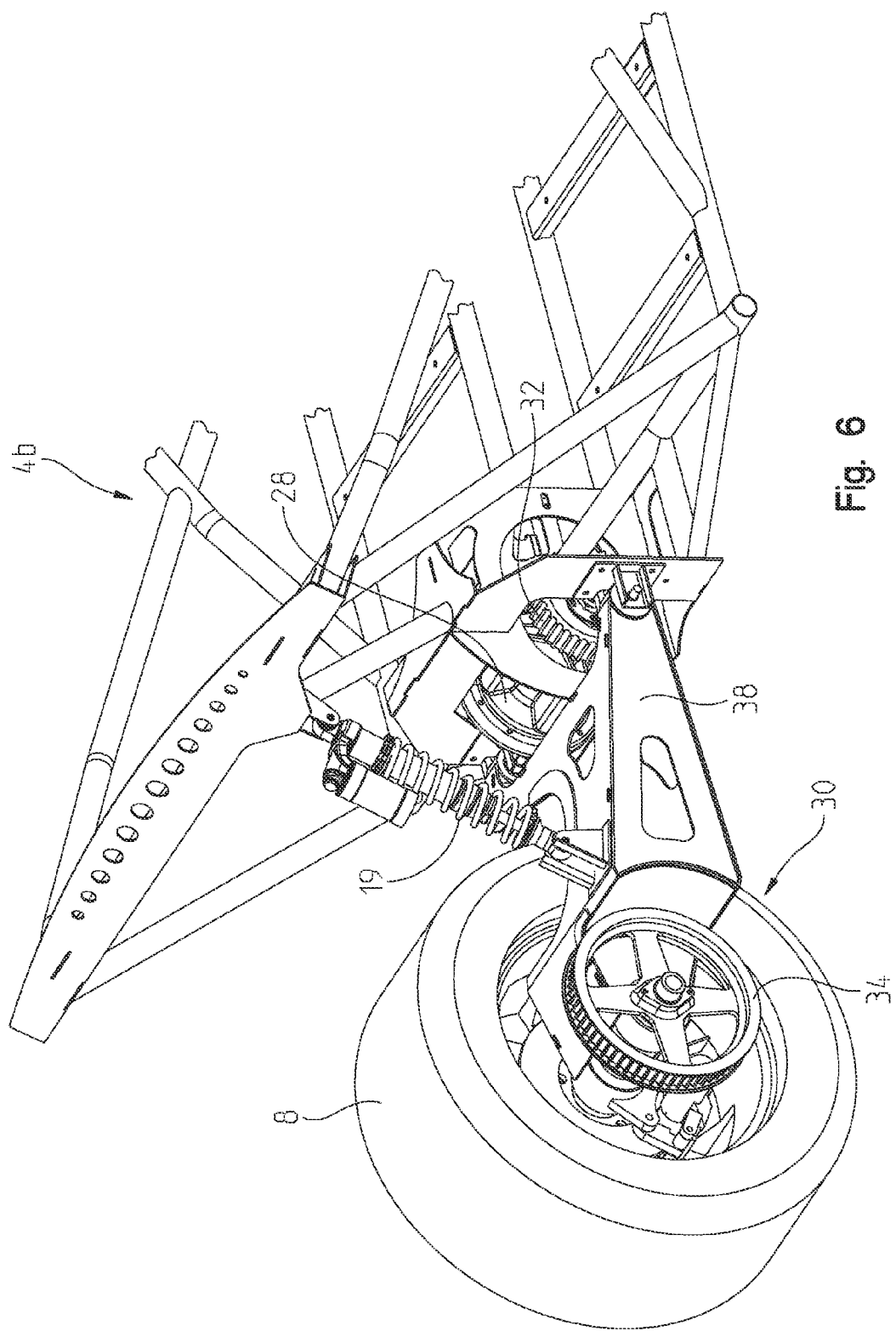
FIG. 6 is a rear right perspective view of a final drive assembly of the powertrain assembly of FIG. 5.
Figure 7:
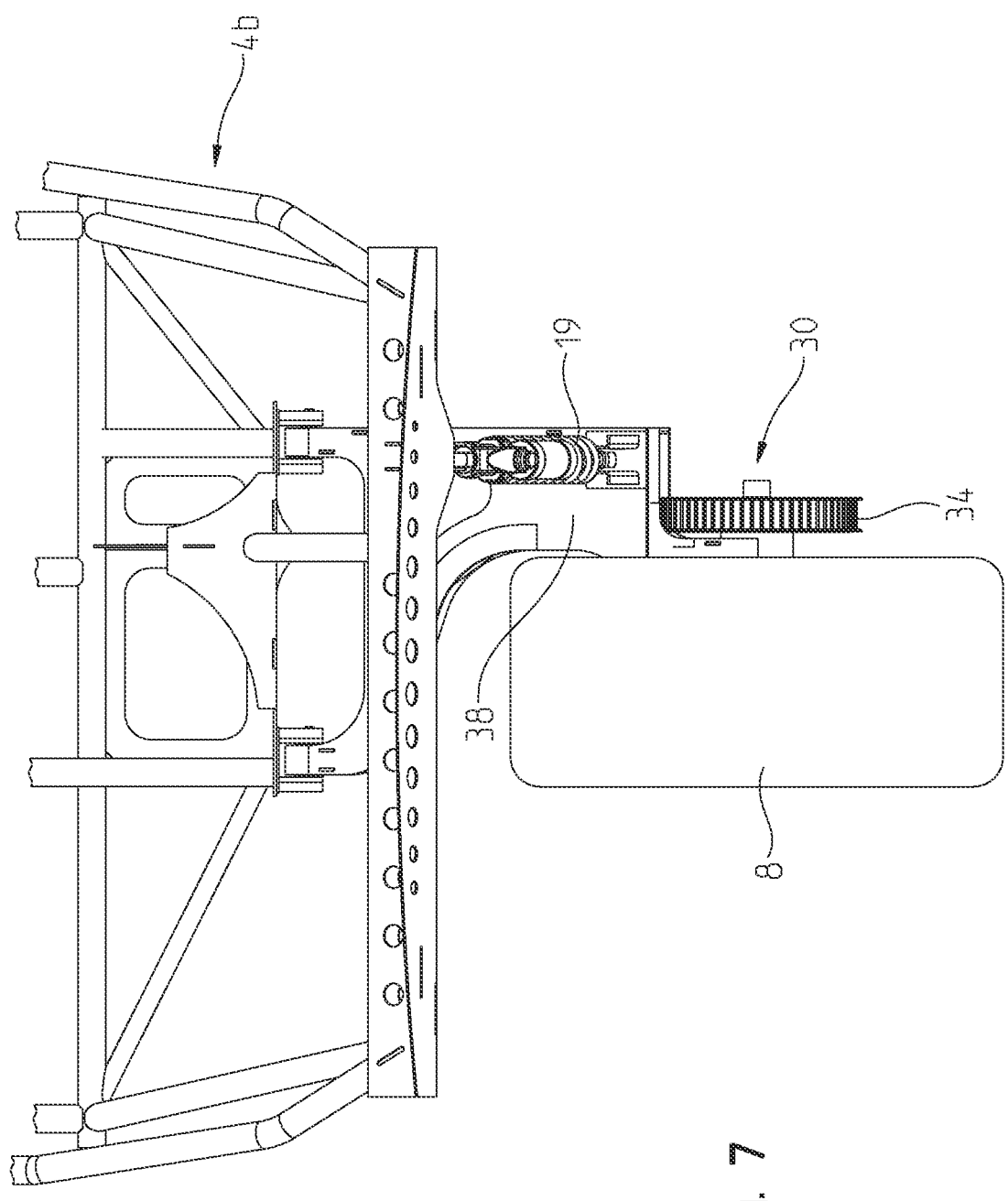
FIG. 7 is a top view of the final drive assembly of FIG. 6.

Referring to FIGS. 4 and 5, powertrain assembly 20 extends longitudinally from front frame portion 4a to rear frame portion 4b. Exemplary powertrain assembly 20 includes an engine 22, a transmission 24, a drive shaft 26, a rear or final drive 28, a front drive (not shown), and a belt drive assembly 30. Illustrative engine 22 may be an automotive-style engine and is directly coupled to transmission 24. Transmission 24 may be a manual or automatic transmission. For example, engine 22 may be a GM 2.4L Ecotec LE5 (P/N 12619532) or other similar engine, and transmission 24 may be a complementary manual transmission, such as an Aisin AR5 MA5 (P/N 24240205). Alternatively, transmission 24 may be a continuously variable transmission. Additionally, engine 22 and transmission 24 may be any type of engine and transmission configured to operate vehicle 2 according to the application of vehicle 2.

As shown in FIGS. 4 and 5, engine 22 is directly and operably coupled to transmission 24. Transmission 24 is operably coupled to final drive 28 through drive shaft 26. In particular, transmission 24 is operably coupled to drive shaft 26 through a first universal joint 29a and drive shaft 26 is operably coupled to final drive 28 through a second universal joint 29b.

With reference now to FIGS. 5-9, final drive 28 is operably coupled to rear wheel 8 through belt drive assembly 30. Belt drive assembly 30 includes a first or drive sprocket 32, a second or driven sprocket 34, and a belt 36. Drive sprocket 32 is operably coupled to driven sprocket 34 through belt 36. In particular, drive sprocket 32 is longitudinally forward of driven sprocket 34 and is operably coupled to final drive 28. During operation of vehicle 2, final drive 28 rotates drive sprocket 32, thereby causing belt 36 to rotate about drive sprocket 32 and effect rotation of driven sprocket 34 in order to drive rear wheel 8.

Drive sprocket 32 has a plurality of teeth 39 which facilitate rotation of belt 36 about drive sprocket 32. For example, teeth 39 of drive sprocket 32 may mesh or otherwise engage with belt 36 to rotate belt 36 about drive sprocket 32.

Figure 8:
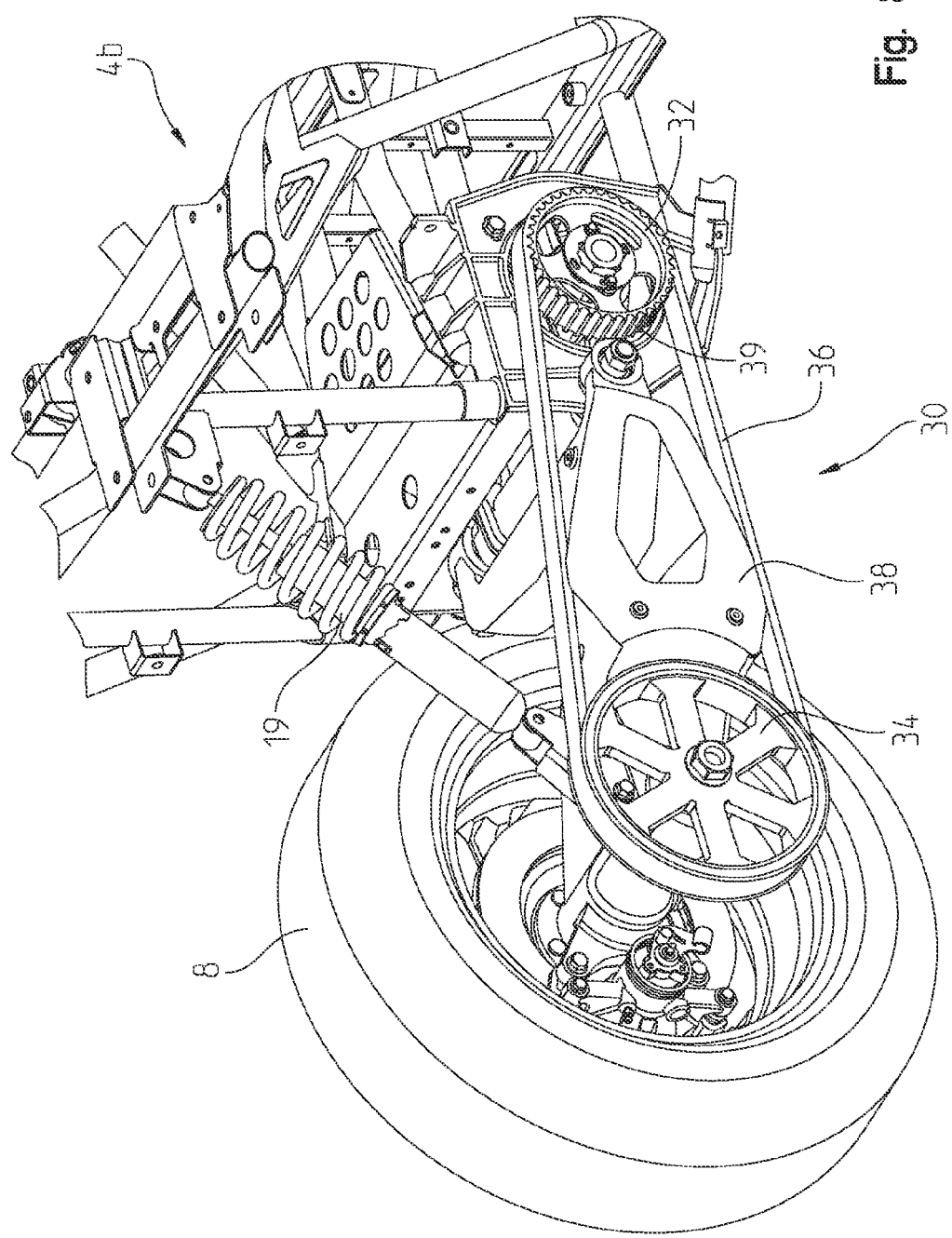
FIG. 8 is a further rear right perspective view of the final drive assembly of FIG. 6, including a belt.
Figure 9:
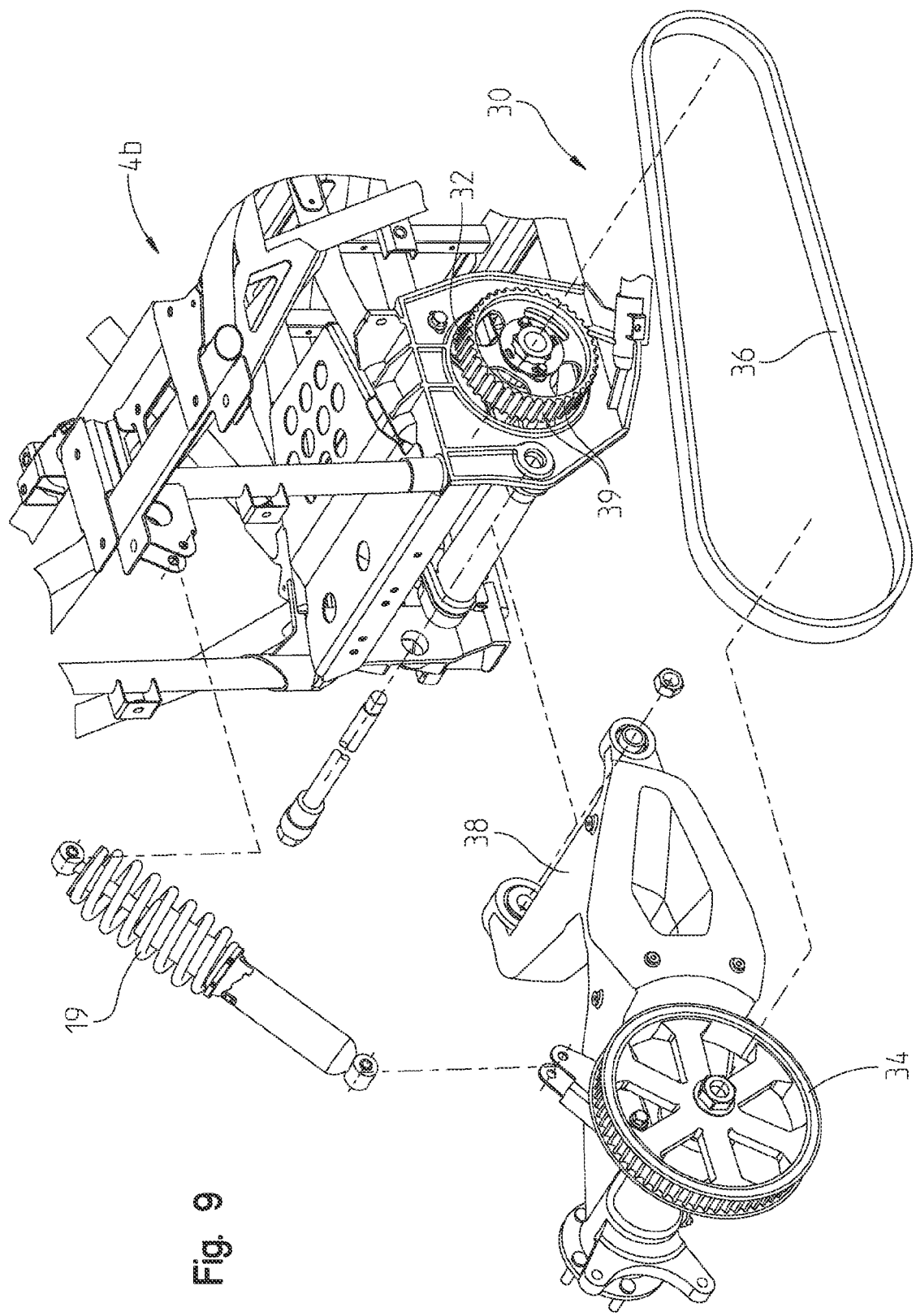
FIG. 9 is an exploded view of the final drive assembly of FIG. 8.
Figure 10:
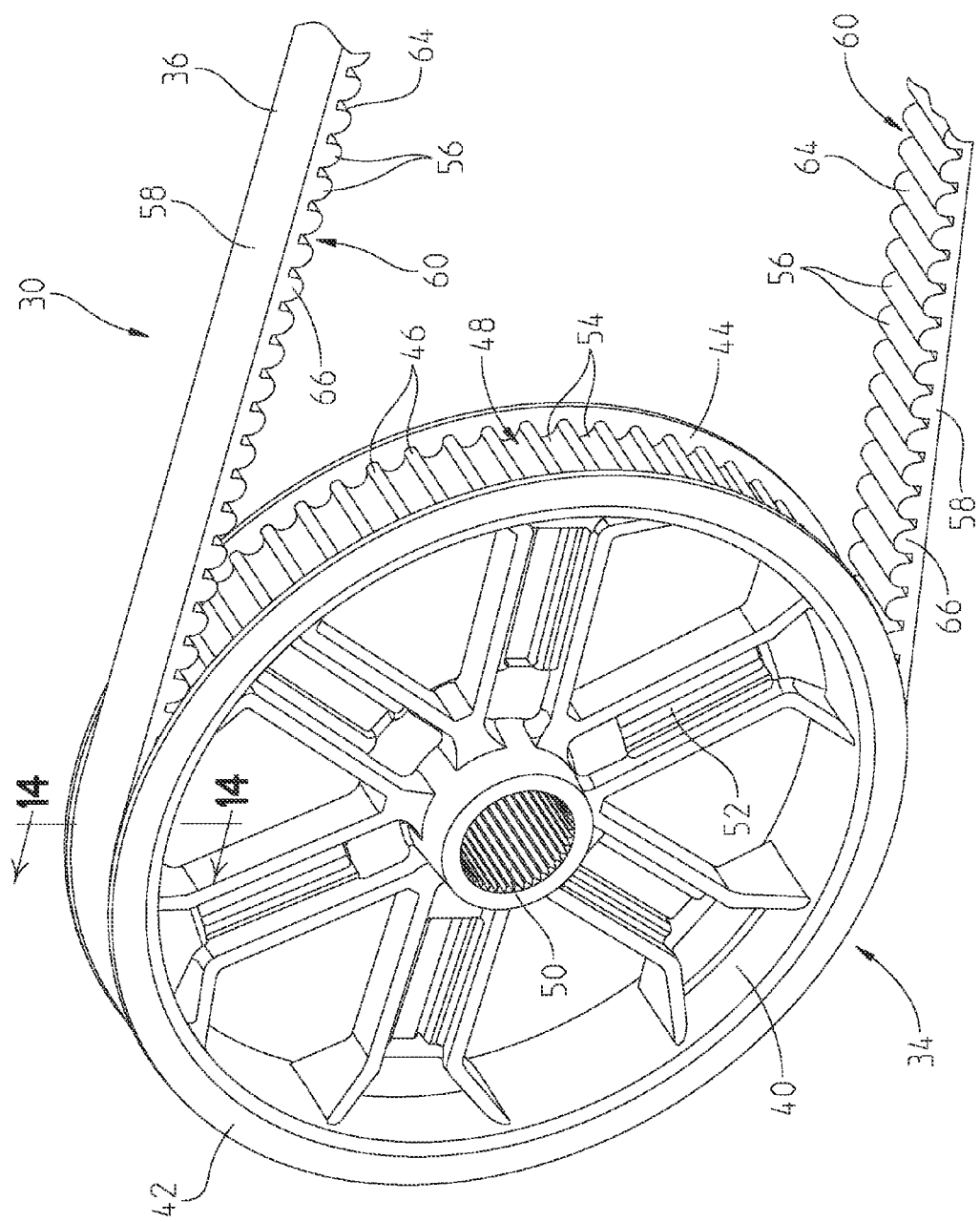
FIG. 10 is a front right perspective view of a sprocket and a belt of the final drive assembly of FIG. 8.

Referring to FIG. 10-14, illustrative embodiments of driven sprocket 34 and belt 36 of belt drive assembly 30 are shown. As disclosed herein, illustrative driven sprocket 34 is operably coupled to drive sprocket 32 (FIG. 8) through belt 36. As shown in FIG. 10, belt 36 includes a plurality of belt teeth 56 which define an innermost surface of belt 36. Belt 36 also includes an outer surface 58 radially outward from belt teeth 56 which defines an outermost surface of belt 36. Belt 36 also includes a first or laterally outer side 86 and a second or laterally inner side 88, both of which define the width of belt 36 in the direction of an axis of rotation A of driven sprocket 34 (FIG. 8). Each one of belt teeth 56 is spaced apart from adjacent belt teeth 56 by a land area or recess 60. Each one of belt teeth 56 includes a radially inner end portion 64 defining the innermost surface of belt teeth 56 and belt 36 and a radially outer end portion 66 adjacent outer surface 58.

Figure 14:
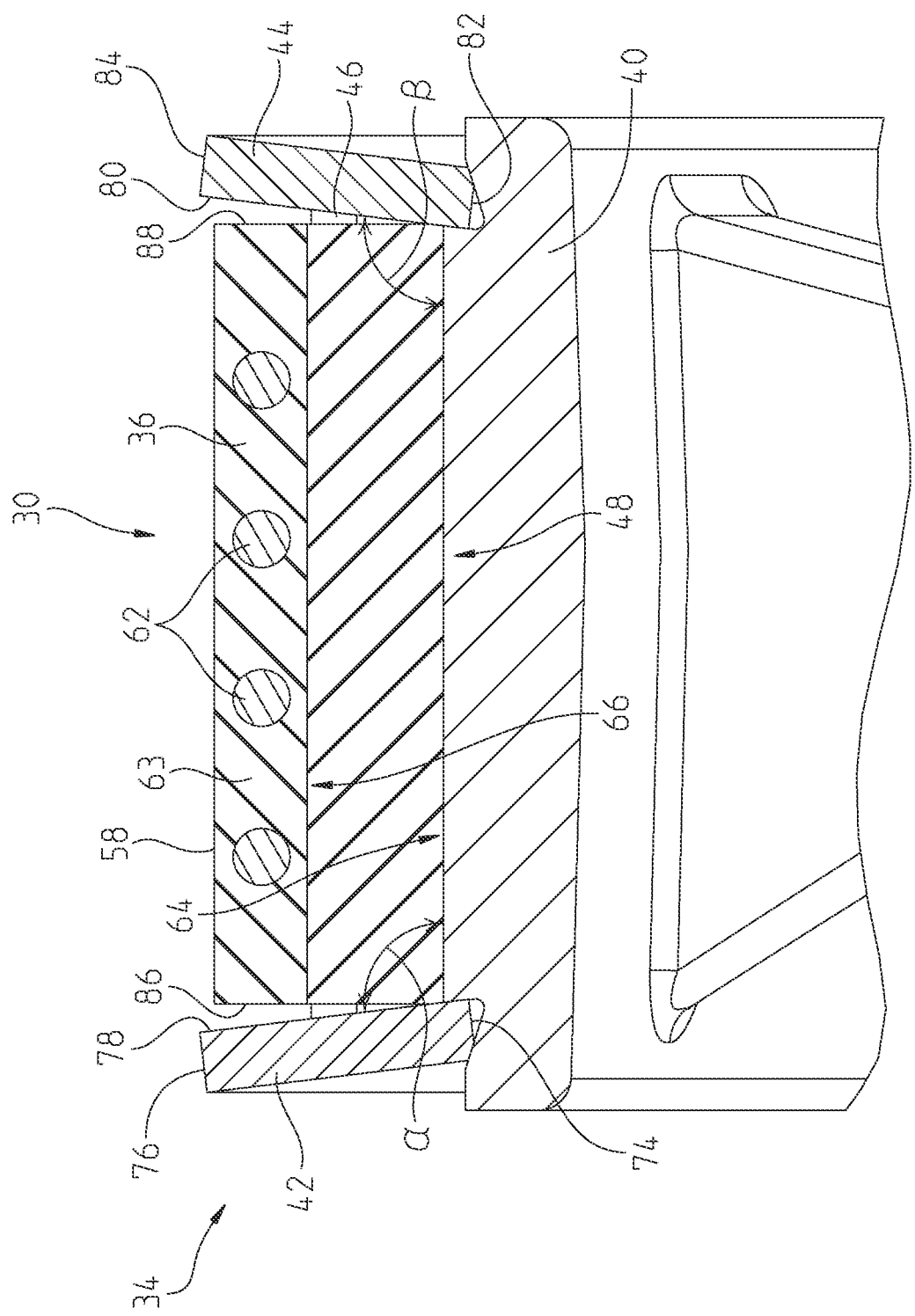
FIG. 14 is a cross-sectional view of the sprocket and belt of FIG. 10, taken along line 14-14 of FIG. 10.

Referring to FIG. 14, belt 36 may be comprised of one or more polymeric materials, such as urethane, and may further include at least one reinforcement member, for example a cord 62, in a cord portion 63 of belt 36. Cords 62 may be comprised of a rigid polymeric material and/or a metallic material and are generally positioned intermediate belt teeth 56 and outer surface 58. Cord portion 63 may be positioned intermediate outer end portion 66 of belt teeth 56 and outer surface 58 of belt 36. In one embodiment, cords 62 are comprised of Kevlar and/or a carbon-fiber material. Illustratively, four cords 62 are shown in FIG. 14 extending in the circumferential direction of belt 36, however, any number of cords 62 may be used.

Figure 11:
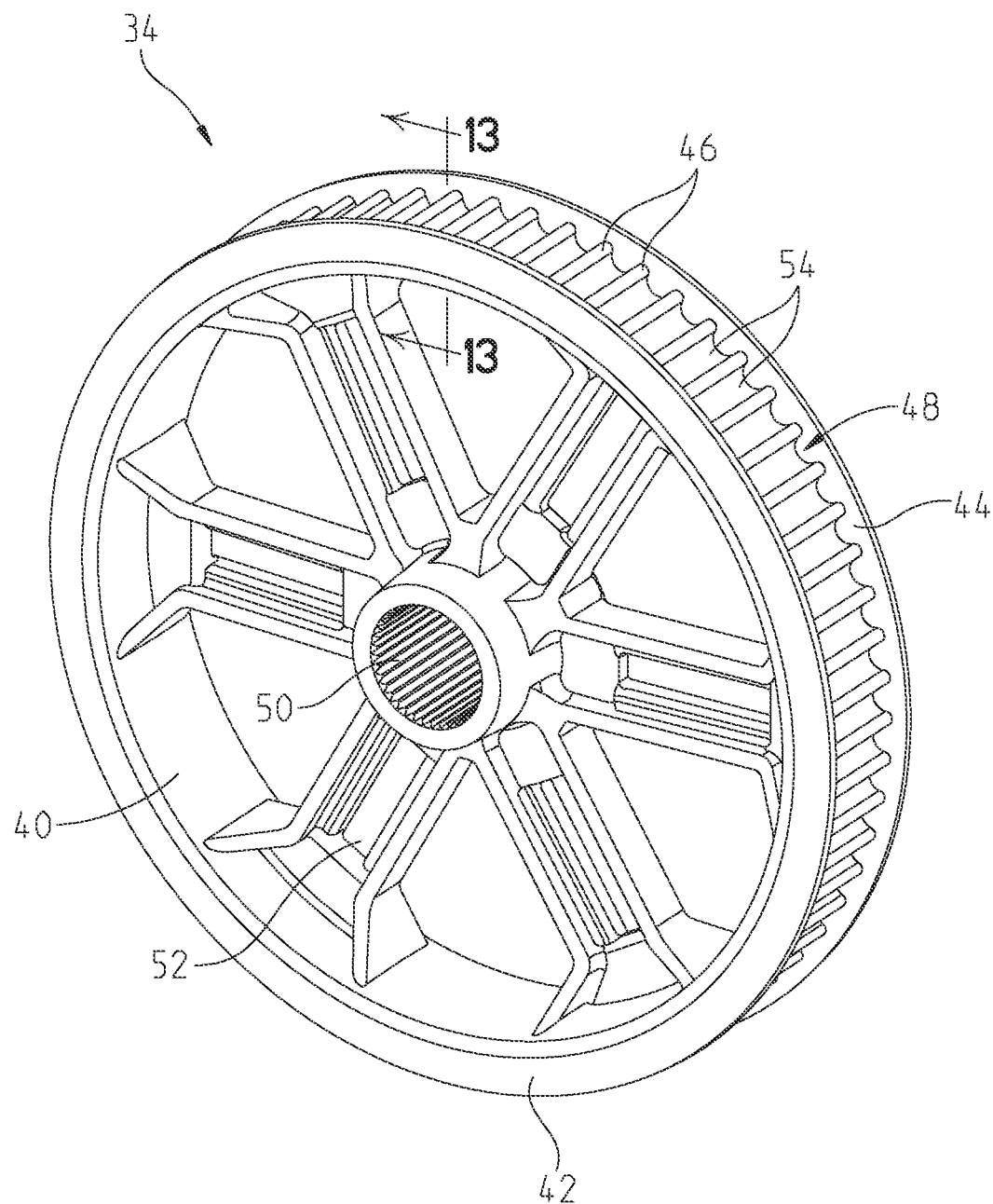
FIG. 11 is a front right perspective view of the sprocket of FIG. 10.
Figure 12:
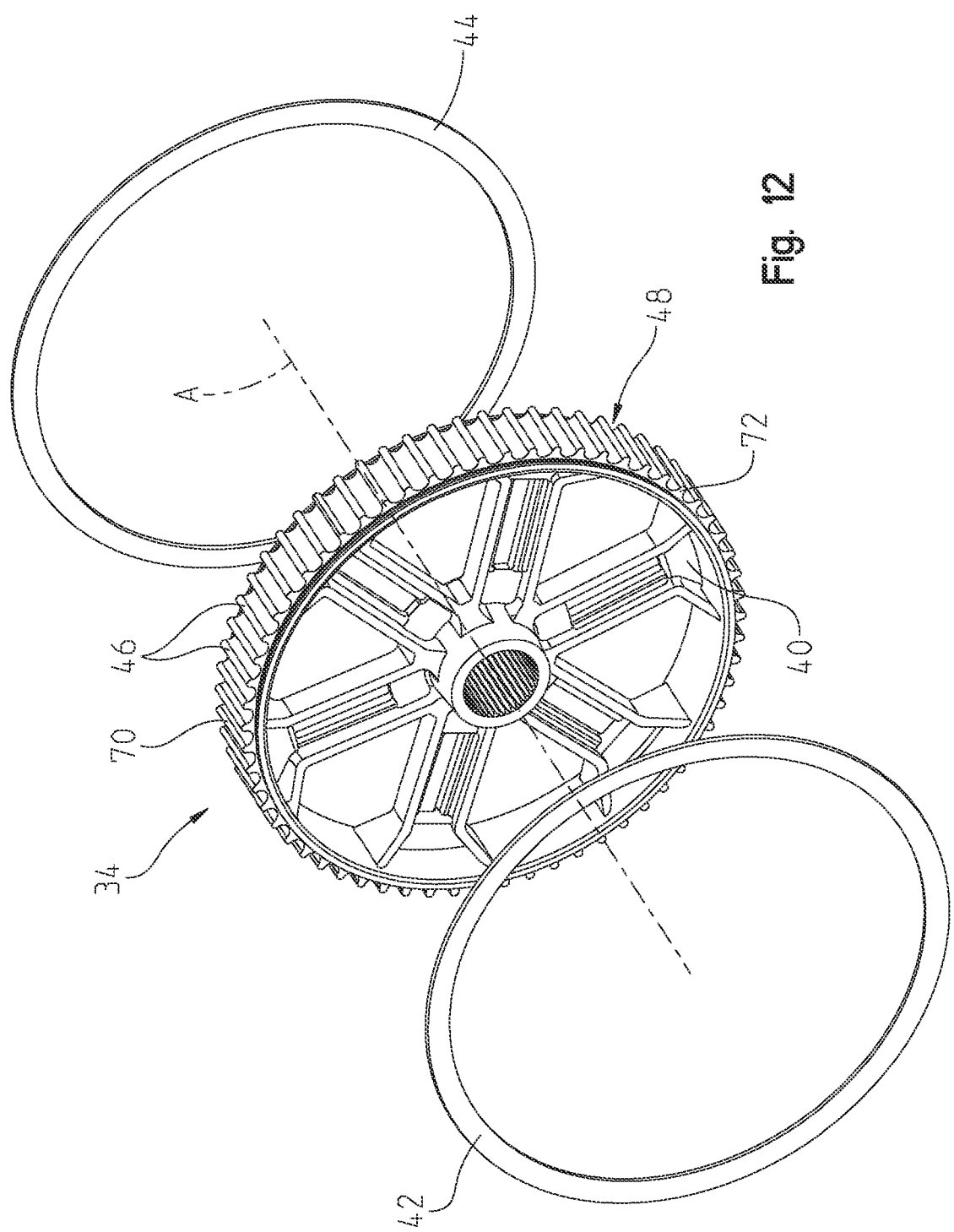
FIG. 12 is an exploded view of the sprocket of FIG. 11.

During operation of vehicle 2, belt teeth 56 engage with teeth 39 of drive sprocket 32 to cause rotation of driven sprocket 34. As shown in FIGS. 11 and 12, driven sprocket 34 includes a body 40, an outer flange 42, an inner flange 44, and a plurality of sprocket teeth 46. Body 40 is generally circular and includes a circumferential outer surface 48 configured to engage with belt 36. Body 40 of driven sprocket 34 may include a threaded aperture 50 for operably coupling to rear wheel 8 through an axle and a plurality of spokes 52 extending between threaded aperture 50 and outer surface 48. As shown in FIG. 12, driven sprocket 34 and rear wheel 8 (FIG. 8) rotate about axis of rotation A during operation of vehicle 2.

Sprocket teeth 46 extend radially outwardly from body 40 of driven sprocket 34. As disclosed further herein, as sprocket teeth 46 extend radially outwardly, the width of sprocket teeth may increase, such that the width of a radially outer end 70 of sprocket teeth 46 is greater than the width of a radially inner end 72 of sprocket teeth 46. Each one of sprocket teeth 46 is spaced apart from adjacent sprocket teeth 46 by a land area or recess 54. In the exemplary embodiment of driven sprocket 34, sprocket teeth 46 may be integral with body 40 such that sprocket teeth 46 and/or recesses 54 therebetween define outer surface 48 of body 40. For example, illustrative driven sprocket 34 is formed through a casting process such that body 40 and sprocket teeth 46 are integrally formed with each other. Alternatively, sprocket teeth 46 may be formed separately from body 40 and subsequently coupled to outer surface 48 of body 40 through conventional coupling processes, such as welding, fastening, adhering, or other similar processes. While the actual exterior profile of driven sprocket 34 follows sprocket teeth 46 and, therefore, includes a plurality of radially-extending peaks and a plurality of radially-inward recesses 54 between sprocket teeth 46, circumferential outer surface 48 of driven sprocket is defined as the surface following the largest uninterrupted circle that may be drawn about a continuous surface of driven sprocket 34.

Figure 13:
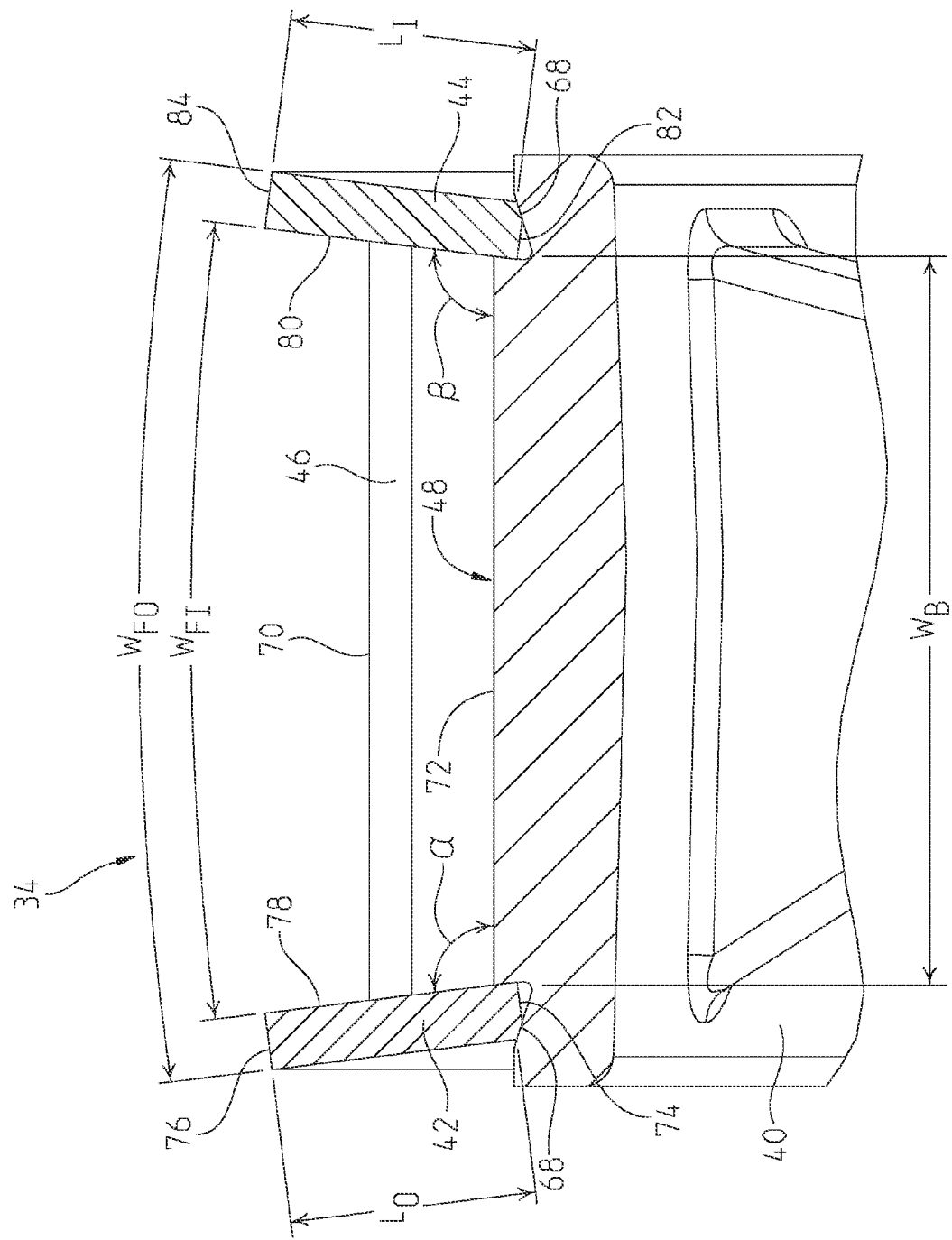
FIG. 13 is a cross-sectional view of the sprocket of FIG. 11, taken along line 13-13 of FIG. 11.

Referring to FIGS. 11-13, body 40 of driven sprocket 34 is coupled to outer flange 42 and inner flange 44. Flanges 42, 44 reduce the likelihood that belt 36 will slide or otherwise move off of driven sprocket 34 if a load, for example a torque reversal, causes belt 36 to move in a direction parallel to axis of rotation A and shift towards one side of driven sprocket 34. Additionally, flanges 42, 44 guide belt 36 onto driven sprocket 34 during rotation of belt 36.

As shown in FIG. 12, flanges 42, 44 are generally circular and washer- or ring-shaped such that flanges 42, 44 have an inner diameter and an outer diameter. As shown in FIG. 13, outer and inner flanges 42, 44 are positioned within a shoulder 68 of body 40 such that flanges 42, 44 do not extend beyond the width $W_B$ of body 40. As such, the outer width $W_{FO}$ of flanges 42, 44 is not greater than the width $W_B$ of body 40.

As shown in FIG. 13, outer flange 42 includes an inner or belt surface 78 which faces, or is otherwise exposed to, belt 36. Additionally, outer flange 42 includes a radially inner end 74 and a radially outer end 76. A length $L_O$ of outer flange 42 is defined between radially inner and outer ends 74, 76. Radially inner end 74 is coupled to body 40 at shoulder 68. Illustratively, both radially inner and outer ends 74, 76 of outer flange 42 are angled relative to circumferential outer surface 48 of body 40 such that outer flange 42 extends diagonally to the radial direction from body 40.

More particularly, outer flange 42 is obtusely angled relative to outer surface 48 of body 40 such that belt surface 78 forms an obtuse angle α with outer surface 48 of body 40. Additionally, because outer surface 48 of body 40 is generally parallel to axis of rotation A (FIG. 12) of driven sprocket 34, belt surface 78 of outer flange 42 also is obtusely angled relative to axis of rotation A. In one embodiment, obtuse angle α may be approximately 93-105 degrees. In a further embodiment, obtuse angle α may be approximately 97 degrees. Obtuse angle α may be adjusted to accommodate various applications of belt drive assembly 30.

Referring still to FIG. 13, because portions of belt surface 78 near radially inner and outer ends 74, 76 are aligned with each other, obtuse angle α is constant along length $L_O$ of outer flange 42. As such, portions of belt surface 78 proximate both inner and outer ends 74, 76 are angled relative to circumferential outer surface 48 of body 40 by obtuse angle α and the complete length $L_O$ of belt surface 78 of outer flange 42 is obtusely angled. Alternatively, either radially inner or outer end 74, 76 may be perpendicular to outer surface 48 of body 40 and axis of rotation A, such that inner and outer ends 74, 76 are not diagonally aligned and only a portion of length $L_O$ of outer flange 42 may be obtusely angled relative to outer surface 48 of body 40 and axis of rotation A. For example, in one embodiment, approximately half of length $L_O$ of outer flange 42 is obtusely angled relative to outer surface 48 and axis of rotation A. In a further alternative embodiment, at least 75% of length $L_O$ of outer flange 42 is obtusely angled relative to outer surface 48 and axis of rotation A.

Similarly, as shown in FIG. 13, inner flange 44 includes an inner or belt surface 80 which faces, or is otherwise exposed to, belt 36. As such, belt surface 80 of inner flange 44 faces belt surface 78 of outer flange 42. Additionally, inner flange 44 includes a radially inner end 82 and a radially outer end 84. A length $L_I$ of inner flange 44 is defined between inner and outer ends 82, 84. Radially inner end 82 is coupled to body 40 at shoulder 68. Illustratively, both radially inner and outer ends 82, 84 of inner flange 44 are angled relative to circumferential outer surface 48 of body such that inner flange 44 extends diagonally to the radial direction from body 40. More particularly, inner flange 44 is obtusely angled relative to outer surface 48 of body 40 such that belt surface 80 forms an obtuse angle β with outer surface 48 of body 40. Additionally, because outer surface 48 of body 40 is generally parallel to axis of rotation A (FIG. 12) of driven sprocket 34, belt surface 80 of inner flange 44 also is obtusely angled relative to axis of rotation A. In one embodiment, obtuse angle β may be approximately 93-105 degrees. In a further embodiment, obtuse angle β may be approximately 97 degrees. While obtuse angles α and β of the illustrative embodiment are equal, alternative embodiments may include flanges 44, 42 with different obtuse angles α and β, respectively. For example, in one alternative embodiment, obtuse angle α may be greater than obtuse angle β. Obtuse angle β may be adjusted to accommodate various applications of belt drive assembly 30.

Referring still to FIG. 13, because portions of belt surface 80 of radially inner and outer ends 82, 84 are aligned with each other, obtuse angle β is constant along length $L_I$ of inner flange 44. As such, portions of belt surface 78 proximate both inner and outer ends 82, 84 are angled relative to circumferential outer surface 48 of body 40 by obtuse angle β and the complete length $L_I$ of belt surface 80 of inner flange 44 is obtusely angled. Alternatively, either radially inner or outer end 82, 84 may be perpendicular to outer surface 48 of body 40 and axis of rotation A, such that inner and outer ends 82, 84 are not diagonally aligned and only a portion of length $L_I$ of inner flange 44 may be obtusely angled relative to outer surface 48 of body 40 and axis of rotation A. For example, in one embodiment, approximately half of length $L_I$ of inner flange 44 is obtusely angled relative to outer surface 48 and axis of rotation A. In a further alternative embodiment, at least 75% of length $L_I$ of inner flange 44 is obtusely angled relative to outer surface 48 and axis of rotation A.

Outer and inner flanges 42, 44 are adjacent to and in contact with sprocket teeth 46, as shown in FIG. 13. Because outer and inner flanges 42, 44 are angled away from sprocket teeth 46, an inner width $W_{FI}$ between flanges 42, 44 increases in the radial direction. Therefore, as sprocket teeth 46 extend radially outward, the width of sprocket teeth may increase, such that the width of radially outer end 70 of sprocket teeth 46 is greater than the width of radially inner end 72 of sprocket teeth 46.

In one embodiment, outer and inner flanges 42, 44 may be integrally formed with body 40 through casting or other similar processes. Alternatively, inner flange 44 and/or outer flange 42 may be coupled to body 40 in a secondary process. For example, illustrative outer flange 42 may be initially formed in a separation operation from body 40. Prior to coupling outer flange 42 to body 40, outer flange 42 may be heated to increase the size of outer flange 42. When heated, outer flange 42 may be positioned within a shoulder 68 of body 40 in order to couple with body 40. In this way, outer flange 42 is temperature fit or thermally coupled to body 40. Once outer flange 42 is coupled to shoulder 68 of body 40, a die or other mechanism may be applied to outer flange 42 in order to define obtuse angle α as outer flange 42 cools and couples with body 40.

During operation of vehicle 2, belt 36 rotates about drive sprocket 32 and driven sprocket 34 to rotate rear wheel 8. As shown in FIG. 14, belt 36 is positioned generally over sprocket teeth 46 and between outer and inner flanges 42, 44. As shown in FIG. 14, the width of belt 36 (defined in the direction or axis of rotation A (FIG. 8)) is less than inner width $W_{FI}$ of flanges 42, 44. Therefore, a distance between flanges 42, 44 and cords 62 of belt 36 is greater than a distance between flanges 42, 44 and belt teeth 56 because the width of belt 36 is generally less than the inner width $W_{FI}$ of flanges 42, 44 and flanges 42, 44 are angled relative to sides 86, 88 of belt 36.

Inner and outer sides 88, 86 of belt 36 are generally parallel to each other during initial use of belt 36, such that sides 86, 88 are angled relative to belt surfaces 78, 80 of flanges 42, 44, respectively, and are generally perpendicular to outer surface 48 of body 40 and axis of rotation A. Due to the angled relationship between flanges 42, 44 and sides 86, 88 of belt 36, only a small portion of belt 36 contacts flanges 42, 44. In particular, only radially inner end portion 64 of belt teeth 56 contacts radially inner ends 74, 82 of flanges 42, 44, respectively, because flanges 42, 44 angle away from sides 86, 88 of belt 36. As such, radially outer ends 76, 84 of flanges 42, 44, respectively, are spaced apart from sides 86, 88 of belt 36. More particularly, radially outer ends 76, 84 of flanges 42, 44, respectively, are angled away from outer surface 58 of belt 36 and radially outer end portion 66 of belt teeth 56.

When sides 86, 88 of belt 36 are parallel to flanges 42, 44, a noise may be produced when belt teeth 56 rotate off of driven sprocket 34. However, in the illustrative embodiment of FIG. 14, because belt surfaces 78, 80 of flanges 42, 44, respectively, are obtusely angled and angle away from sides 86, 88 of belt 36, only a small portion of belt 36 contacts flanges 42, 44 during initial operation of belt 36. In this way, belt teeth 56 are configured to lift directly out of recesses 54 between sprocket teeth 46 when belt teeth 56 are rotating off of driven sprocket 34 and toward drive sprocket 32. As such, sides 86, 88 of belt 36 do not contact or drag, rub, or scrape against the entire lengths $L_O$ and $L_I$ of belt surfaces 78, 80, respectively, when rotating off of, or away from, driven sprocket 34 toward drive sprocket 32. By minimizing the contact between belt 36 and flanges 42, 44 during operation of belt drive assembly 30, noise which may otherwise be produced as a result of "belt scrub," or contact, between belt 36 and flanges 42, 44 (e.g., chirp noise) is reduced. More particularly, by decreasing the size of the load interface between belt 36 and flanges 42, 44, noise produced when belt 36 leaves driven sprocket 34 is reduced.

Additionally, some belt drive assemblies may produce a sound, such as a chirp sound or other noise, when cord portion 63 of belt 36 contact flanges 42, 44 as belt teeth 56 rotate off of driven sprocket 34 because the material of cord portion (e.g., urethane) and/or the material of cords 62 (e.g., metal) rubs against the metallic material of flanges 42, 44. More particularly, a noise may be produced from a belt drive assembly due to the natural frequency of driven sprocket 34 when "excited" by a portion of belt 36 rubbing against flanges on driven sprocket 34. As such, the contact between the materials of cord portion 63 and/or the metal of flanges 42, 44 may produce a noise during movement of belt 36. However, because flanges 42, 44 are obtusely angled, flanges 42, 44 are spaced apart from cord portion 63 of belt 36. Therefore, cord portion is not in contact with flanges 42, 44 during operation of belt 36, such that cord portion does not scrape, drag, or rub against, or otherwise contact, flanges 42, 44 when belt teeth 56 rotate off of driven sprocket 34. Therefore, by angling flanges 42, 44 away from cord portion 63 and reducing contact between cord portion 63 and flanges 42, 44, noise from belt drive assembly 30 also is reduced.

During extended use of belt 36, sides 86, 88 of belt 36 may change shape due to wear such that sides 86, 88 are no longer parallel to each other and are no longer perpendicular to axis of rotation A. For example, sides 86, 88 may become angled in a similar manner to that of flanges 42, 44. For example, sides 86, 88 may angle outwardly at an obtuse angle relative to axis of rotation A. As such, the size of the load interface between belt teeth 56 and flanges 42, 44 increases and is obtusely angled. The larger load interface between belt teeth 56 and flanges 42, 44 allows the load to be distributed over a larger area, thereby reducing noise from belt drive assembly 30. Additionally, because the load interface in angled, belt teeth 56 directly lifts away from driven sprocket 34 during rotation of belt 36 because sides 86, 88 of belt 36 are able to slide past belt surfaces 78, 80 of flanges 42, 44, respectively, without rubbing, scraping, or dragging against belt surfaces 78, 80. In this way, when belt 36 becomes worn, it may have the general appearance and performance characteristics of a V-belt. Therefore, if belt 36 becomes worn during use, noise which otherwise may be produced during operation of belt drive assembly 30 is still reduced because the load interface between belt surfaces 78, 80 of flanges 42, 44, respectively, and sides 86, 88 of belt 36 distributes the load over a larger area and allows belt teeth 56 to rotate off of driven sprocket 34 without dragging or scraping against belt surfaces 78, 80.

Radial outer ends 76, 84 of flanges 42, 44, respectively, may be positioned radially inward from outer surface 58 of belt 36. Due to the angled configuration of flanges 42, 44, it may not be necessary for radial outer ends 76, 84 of flanges 42, 44, respectively, to be flush with or radially outward from outer surface 58 of belt 36 in order to maintain belt 36 on driven sprocket 34. For example, radial outer ends 76, 84 of flanges 42, 44, respectively, may be radially inward from outer surface 58 of belt 36 by approximately $\frac{1}{8}^{th}$ or $\frac{1}{4}^{th}$ inch. The angled configuration of flanges 42, 44 also reduces the likelihood that belt 36 will "climb off," "walk off," or otherwise be inadvertently removed from driven sprocket 34 even when outer surface 58 of belt 36 extends radially outward from flanges 42, 44.

While the exemplary embodiment of belt drive assembly 30 includes angled flanges 42, 44 on driven sprocket 34, it is to be understood that flanges 42, 44 may be coupled to drive sprocket 32, as well.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A belt drive assembly, comprising:
    a synchronous belt having an outer surface, a cord positioned inwardly of the outer surface, and a plurality of belt teeth positioned inwardly of the cord, the plurality of belt teeth having an inner end spaced apart from the cord and defining an inner surface of the belt, and the plurality of belt teeth having an outer end positioned adjacent the cord; and
    at least one sprocket having a body configured to rotate about an axis of rotation, a plurality of sprocket teeth extending radially outwardly from the body and configured to mesh with the plurality of belt teeth, and at least one flange coupled to the body and including a portion extending radially outward from the body and having a surface exposed to the synchronous belt, the surface exposed to the synchronous belt extending at an obtuse angle relative to the axis of rotation of the body, and the at least one flange contacts the inner end of the plurality of belt teeth and is spaced apart from the outer end of the plurality of belt teeth.

2. The belt drive assembly of claim 1, wherein the at least one flange has an inner end adjacent the body and an outer end extending radially outward from the inner end, and the outer end of the at least one flange is radially and laterally outward of the cord of the synchronous belt.

3. The belt drive assembly of claim 1, wherein the surface of the at least one flange exposed to the synchronous belt has an inner end adjacent the body, an outer end extending radially outward from the inner end, and a length defined between the inner and outer ends, at least half the length of the surface exposed to the synchronous belt is angled approximately 93-105 degrees relative to the axis of rotation of the body.

4. The belt drive assembly of claim 1, wherein the at least one flange includes an outer flange having a first surface exposed to the synchronous belt which extends at a first obtuse angle relative to the axis of rotation of the body and an inner flange having a second surface exposed to the synchronous belt which extends at a second obtuse angle relative to the axis of rotation of the body.

5. The belt drive assembly of claim 4, wherein the first and second obtuse angles are approximately 93-105 degrees.

6. The belt drive assembly of claim 1, wherein the at least one flange is thermally coupled to the body.

7. A powertrain assembly, comprising:
an engine;
a transmission operably coupled to the engine; and
a belt drive assembly operably coupled to the transmission and including:
a synchronous belt having a plurality of belt teeth and a cord positioned outwardly from the plurality of belt teeth, the plurality of belt teeth having an inner end spaced apart from the cord and defining an inner surface of the belt, and the plurality of belt teeth having an outer end positioned adjacent the cord; and
a sprocket operably coupled to the synchronous belt and having a body configured to rotate about an axis of rotation, a plurality of sprocket teeth extending radially outwardly from the body, and at least one flange coupled to the body, the body having a radially outer surface configured to receive the synchronous belt and the at least one flange having a surface exposed to the synchronous belt, the surface of the at least one flange exposed to the synchronous belt extending at an obtuse angle relative to the radially outer surface of the body, and a distance between the at least one flange and the cord being greater than a distance between the at least one flange and the plurality of belt teeth in a direction parallel to radially outer surface of the body, and the at least one flange contacts the inner end of the belt teeth and is spaced apart from the outer end of the plurality of belt teeth.

8. The powertrain assembly of claim 7, wherein the surface at least one flange exposed to the synchronous belt has an inner end and outer end, and the inner and outer ends of the at least one flange extend at the obtuse angle relative to the radially outer surface of the body.

9. The powertrain assembly of claim 7, wherein the plurality of belt teeth are configured to contact the at least one flange at a contact area of the flange, and the contact area is angled relative to the plurality of belt teeth during at least a first meshing of the pluralities of belt teeth and sprocket teeth.

10. The powertrain assembly of claim 7, wherein the at least one flange includes an inner flange and an outer flange, the outer flange has a first surface exposed to the synchronous belt which extends at a first obtuse angle relative to the radially outer surface of the body, and the inner flange has a second surface exposed to the synchronous belt which extends at a second obtuse angle relative to the radially outer surface of the body.

11. The powertrain assembly of claim 10, wherein the synchronous belt has an outer surface positioned outwardly from the cord to define a width of the synchronous belt, and a distance between outer ends of the inner and outer flanges is greater than the width of the synchronous belt.

12. The powertrain assembly of claim 10, wherein the first and second obtuse angles are approximately 93-105 degrees.

13. The powertrain assembly of claim 12, wherein the first and second obtuse angles are approximately 97 degrees.

14. The powertrain assembly of claim 7, wherein the at least one flange is thermally coupled to the body.

15. The powertrain assembly of claim 7, wherein the radially outer surface of the body is generally parallel to the axis of rotation.

16. The powertrain assembly of claim 7, wherein each of the sprocket teeth has a width that increases as the sprocket teeth increases in distance from the axis of rotation.

17. The synchronous belt sprocket of claim 1, wherein the circumferential belt engagement surface is positioned at the constant radial distance from the axis of rotation along the entire width.

* * * * *